United States Patent [19]

Segawa

[11] Patent Number: 4,998,133

[45] Date of Patent: Mar. 5, 1991

[54] IMAGE FORMING APPARATUS WITH AN AUTOMATIC DOCUMENT FEEDER

[75] Inventor: Hiroyuke Segawa, Tokyo, Japan

[73] Assignee: Kabushiki Kaisha Toshiba, Kawasaki, Japan

[21] Appl. No.: 366,882

[22] Filed: Jun. 15, 1989

[30] Foreign Application Priority Data

Jun. 30, 1988 [JP] Japan ............................. 63-160895

[51] Int. Cl.⁵ .................... G03B 27/50; G03G 15/00
[52] U.S. Cl. ..................................... 355/51; 355/316; 355/317; 271/251
[58] Field of Search ................... 355/51, 75, 316, 317; 271/3.1, 107, 227, 248, 251

[56] References Cited

U.S. PATENT DOCUMENTS 4,621,801 11/1986 Sanchez ............................. 271/251
4,849,788 7/1989 Prebola ............................. 355/317

Primary Examiner—Michael L. Gellner
Assistant Examiner—D. Rutledge
Attorney, Agent, or Firm—Foley & Lardner, Schwartz, Jeffery, Schwaab, Mack, Blumenthal & Evans

[57] ABSTRACT

An image forming apparatus has a copying device and automatic original document feeding device.

The copying device includes a scanning position where an original document is scanned. The automatic original document feeding device automatically feeds a document to the scanning position. The feeding operation begins before the copying operation with respect to the previous document ends and the next document is fed to the scanning position with an interval distance therebetween after the copying operation with respect to the previous document.

6 Claims, 5 Drawing Sheets

IMAGE FORMING APPARATUS WITH AN AUTOMATIC DOCUMENT FEEDER

BACKGROUND OF THE INVENTION

The present invention relates to an improved image forming apparatus, such as a copying machine, etc., which can automatically feed an original document to a scanning position.

In a conventional copying machine having an automatic original document feeding device, a document is automatically fed to a scanning position of the copying machine. The feeding of the next document is inhibited until the copying operation with respect to the previous document ends to prevent jamming of the documents and damage to the documents at the scanning position.

However, due to the arrangement described above, the copying machine has a problem in that the time necessary for feeding and copying a document is very long.

SUMMARY OF THE INVENTION

It is an object of the present invention to provide an image forming apparatus provided with an automatic original document feeding device which reduces the time necessary for feeding and copying a document.

It is a further object of the present invention to provide an image forming apparatus having an automatic original document feeding device which prevents documents from jamming and being damaged.

In order to achieve the above objects, there is provided an image forming apparatus comprising means for scanning an original document, means for forming an image according to the scanned original, means for feeding an original document to the scanning means, and mean for driving the feeding means. The driving means drives the feeding means so that the feeding operation begins before the copying operation with respect the previous document ends and so that the feeding means feeds documents with an interval distance therebetween according to the previous document after the copying operation with respect to the previous document ends.

BRIEF DESCRIPTION OF THE DRAWINGS

Other objects and features of the present invention will be apparent from the following description taken in connection with the following figures, in which.

DETAILED DESCRIPTION OF THE PREFERRED EMBODIMENTS

Embodiments of the present invention will be described in detail with reference to FIGS. 1 to 5.

Figure 1:
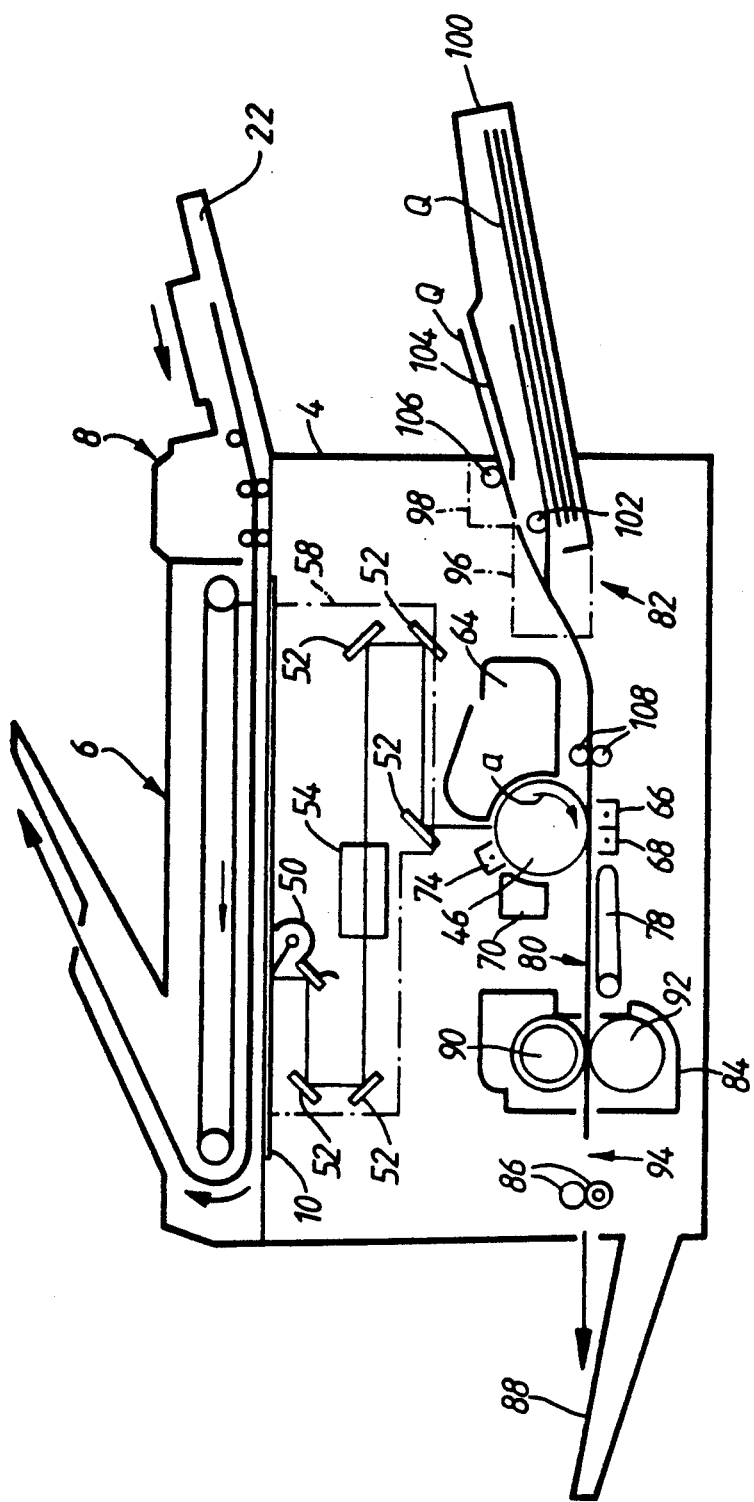
FIG. 1 is a sectional view showing an automatic orignal document feeding device and a copying machine according to an embodiment of the present invention.
Figure 2:
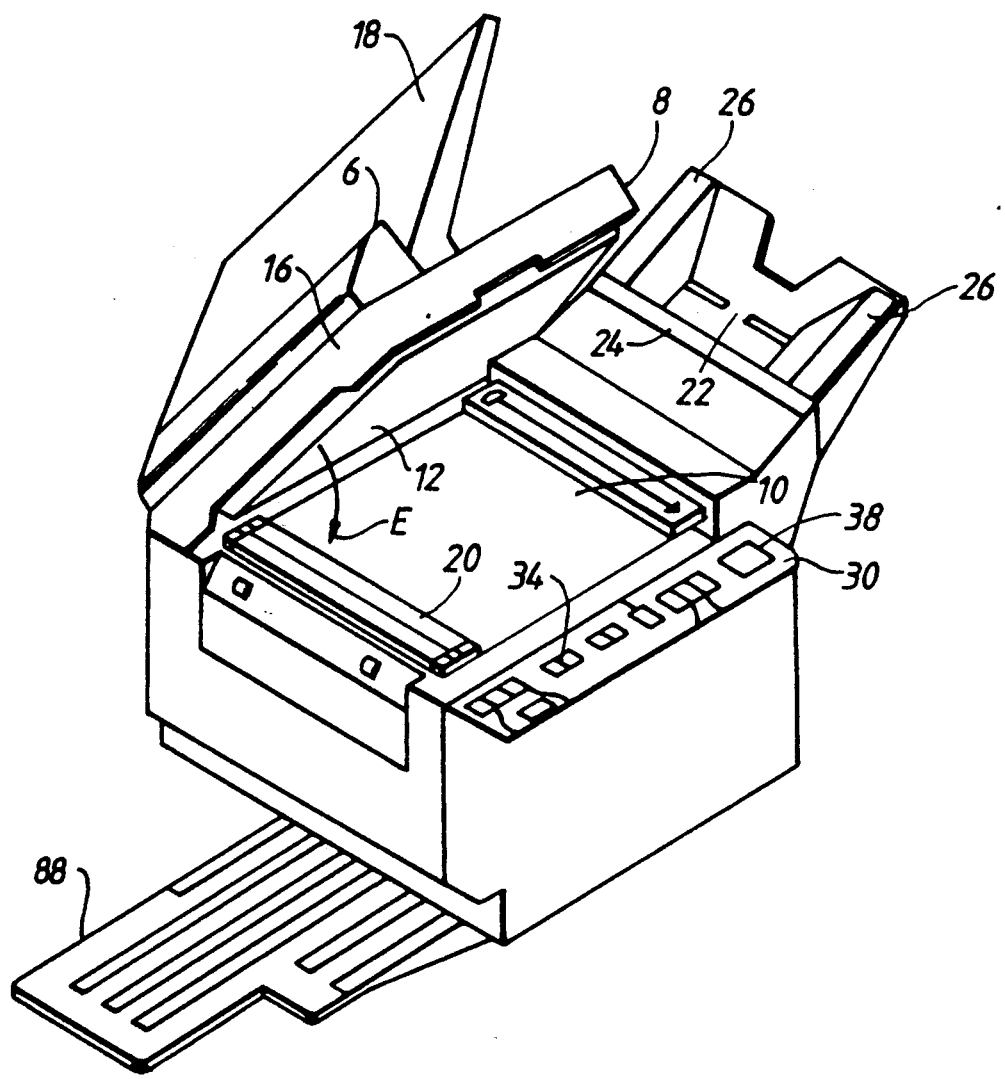
FIG. 2 is a perspective view showing the automatic original document feeding device and a copying machine according to the embodiment of FIG. 1.
Figure 3:
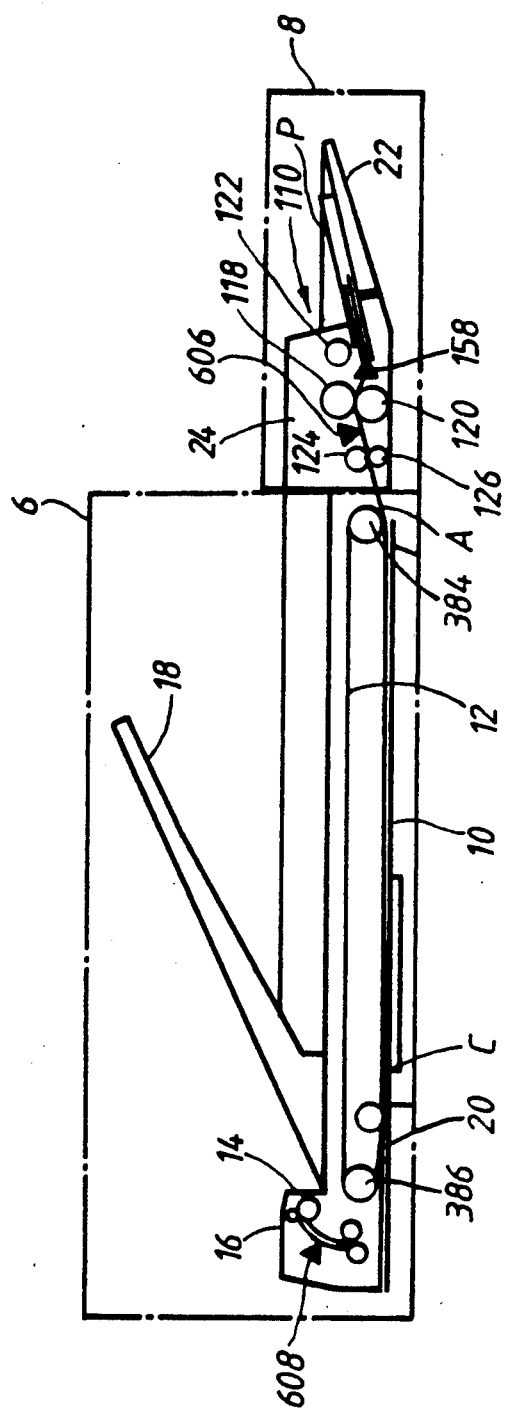
FIG. 3 is a sectional view showing the automatic original document feeding device according to the embodiment of FIG. 1.

As shown in FIGS. 1, 2 and 3, original documents to be copied are stacked on an upper portion of a copying machine body 4. These documents are sequentially fed by a document feeding unit 8 commencing from the uppermost document. The document feeding unit 8 feeds the documents one by one to a conveyor belt unit 6 (to be described later). An exposing table (document table) 10 is arranged at the upper portion of the body 4. The exposing table 10 is made of a transparent material so as to expose a document to be copied. The conveyor belt unit 6 is arranged on the exposing table 10 to be manually opened/closed in the direction indicated by arrow E by an operator at the time of non-exposure.

As shown in FIG. 3, a conveyor belt 12 for feeding a document fed from the document feeding unit 8, a discharging roller 14 for discharging the document, and a cover 16 are arranged in the conveyor belt unit 6. A document tray 18 is disposed above the exposing table 10 at a side opposing the document feeding unit 8 so as to receive the documents fed by the conveyor belt unit 6. A document stopping member 20 is pivotally disposed on the exposing table 10. The document stopping member 20 abuts against the leading edge of the document to set the document fed by the conveyor belt 12 at a predetermined exposure position C.

A document table 22 for stacking a plurality of documents is disposed in the document feeding unit 8 and is inclined with respect to the exposing table 10. A document detector 158 detects whether or not the documents are stacked on the document table 22. The document detector 158 abuts on the document table 22. A document chamber 24 is formed on the document table 22 at a position along the document convey direction so as to receive the leading edges of the documents placed on the document table 22. Guide plates 26 are disposed at opposite sides of the document table 22 along the document convey direction so as to guide the document. These guide plates 26 can be slid in a direction perpendicular to the document convey direction. An operation panel 30 is arranged at the upper portion of the body 4. The operation panel 30 has a start button 38 for starting a copying operation and various setting means 34 for setting various options necessary to the copying operation, for example copying number, copying magnification, etc.

As shown in FIG. 1 a photosensitive drum 46 is rotatably mounted in the body 4. An exposing unit (scanning unit) 58 is arranged between the photosensitive drum 46 and the document feeding unit 6. The exposing unit 58 comprises a lamp 50, a mirror 52, a lens 54 and so on and is moved in synchronism with rotation of the photosensitive drum 46. The exposing unit 58 illuminates a document placed on the exposing table 10 and light reflected by the document is guided to the photosensitive drum 46. In the exposing unit 58, the lens 54 is moved by an exposure driving system (not shown) according to the magnification set by the operator.

A developing unit 64, a transfer unit 66, a separating unit 68, a cleaning unit 70 and a charger 74 are arranged around the photosensitive drum 46 from a focusing position of the exposing unit 58 in the rotational direction of the photosensitive drum 46. The charger 74 and the exposing unit 58 are used to form an electrostatic latent image on the photosensitive drum 46. The developing unit 64 applies a toner to the latent image to form a visible or toner image. The transfer unit 66 transfers the toner image to a copy sheet Q and the separating unit 68 separates the copied sheet Q from the photosensitive drum 46. The cleaning unit 70 removes toner particles left on the photosensitive drum 46 by means of a cleaning blade (not shown).

A convey path 80 of the copy sheet Q has a conveyor belt 78 at the bottom of the body 4. The proximal end of the convey path 80 is connected to a paper feed unit 82 for feeding the copy sheet Q. The distal end of the convey path 80 extends continuously to a discharging tray 88 through the fixing unit 84 and a pair of discharging rollers 86. The fixing unit 84 has a heating roller 90 incorporating a Teflon-coated heater 90. The fixing unit 84 also has a pressing roller 92 biased by a spring (not shown) and brought into rolling contact with the roller 90 to be driven thereby. Heat and pressure act on the copy sheet Q passing through the rollers 90 and 92, thereby fixing the toner image on the copy sheet Q. A conveying path 94 is formed between the fixing unit 84 and the discharging rollers 86 to guide the copy sheet Q.

The paper feed unit 82 has an automatic feeding section 96 and a manual feeding section 98. The automatic feeding section 96 has a cassette or housing 100 for housing copy sheets Q and a feeding roller 102 in rolling contact with the uppermost copy sheet Q in the cassette 100 so as to feed out the sheets one by one. The manual feeding section 98 has a manual feed port 104 above the cassette 100 and a manual feed roller 106 for feeding the copy sheet Q from the port 104 forward. The copy sheet Q fed by automatic feeding section 96 or the manual feeding section 98 is guided to a pair of aligning rollers 108. The copy sheet Q is then fed forward by the rollers 108 to the transfer unit 66 in synchronism with the operation timing.

The document feeding unit 8 (FIG. 3) will now be described. A separating/feeding unit 110 is arranged in the document feeding unit 8. The separating/feeding unit 110 feeds the documents P one by one from the uppermost document of the stacked documents. One or more documents P are fed such that one end of the document is fed to a predetermined position (exposure position C) of the document exposing table 10 by means of the conveyor belt unit 6, which is arranged to be spaced apart from the document exposing table 10 at the upper portion of the body 4. When the document P is copied, it is fed to the document tray 18. In this manner, the documents placed on the document table 22 are sequentially fed through the separating/feeding unit 110 for copying.

As shown in FIG. 3, the chamber 24 includes feeding roller 122 arranged above the document table 22 to feed a document laid on the top of the stack toward a pair of separating rollers 118 and 120. These feeding rollers 122 are brought into contact with a document laid on the top of the stack so that only the top document is intermittently and positively fed to the contact portions of the paired separating rollers 118 and 120. Therefore, only the top document can be fed to the paired separating rollers 118 and 120.

When a plurality of documents including the top one are fed, the paired separating rollers 118 and 120 are rotated to separate the documents one by one and only the top document is fed to the conveyor unit 6 on the exposing table 10. A pair of rollers 124 and 126 for conveying a document are arranged between the exposing table 10 and the separating rollers 118, 120. These conveying rollers 124 and 126 serve to control the timing at which the documents are fed to a waiting position A between the conveyor unit 6 and the rollers 124 and 126, and further to the conveyor unit 6. The peripheral speed of the these conveying rollers 124 and 126 is the substantially equal to the speed of the separating rollers 118, 120. Driving mechanisms of the document feeding unit 8 are described below with reference to FIGS. 3 and 4.

These driving mechanisms are provided with a first power transmitting system having a reversible motor 160, for example, which serves as a common driving source for driving the feeding roller 122, the separating rollers 118, 120 and the conveying rollers 124, 126.

The document conveyor unit 6 will now be described in detail with reference to FIG. 3.

A number of engaging holes (not shown) are formed in the surface of the conveyor belt 12 at a predetermined pitch. Driving belt wheels (not shown) having engaging projections to be engaged with the engaging holes are arranged at opposite ends of the belt rollers 384. The other belt roller 386 is arranged in the same manner as described above. A driving belt wheel (not shown) is arranged on at least the driving belt roller 386. The engaging projections need not be formed on the belt roller 386. When the conveyor belt 12 and the belt roller 386 are constructed in the manner described above, the conveyor belt 12 will not slip on the belt roller 384. The belt roller 384 can be rotated by a belt motor 422 (FIG. 4) as a second power transmitting system for conveying the document to the predetermined position C, thereby controlling the driving distance of the motor 422 so as to properly stop the document in the exposure position. In addition, an electromagnetic brake (not shown) is mounted on the shaft of the motor 422, so that the conveyor belt 12 or the belt roller 384 will not overrun by an inertia force. Thus the document can be properly fed/stopped with high precision.

According to the arrangement as described above, the document feeding unit 8 enables the documents stacked on the document table 22 to be reliably fed one by one from the top of the stacked documents toward the exposing table 10. The document which has reached the exposing table 10 is set at a predetermined position C on the exposing table 10 by means of the conveyor unit 6 and then exposed. After exposure, the document is further fed by the conveyor unit 6 (which includes the discharging rollers 14) to the tray 18. On the tray 18, the documents are stacked in feeding order. The same process is repeated for copying a plurality of documents P.

Figure 4:
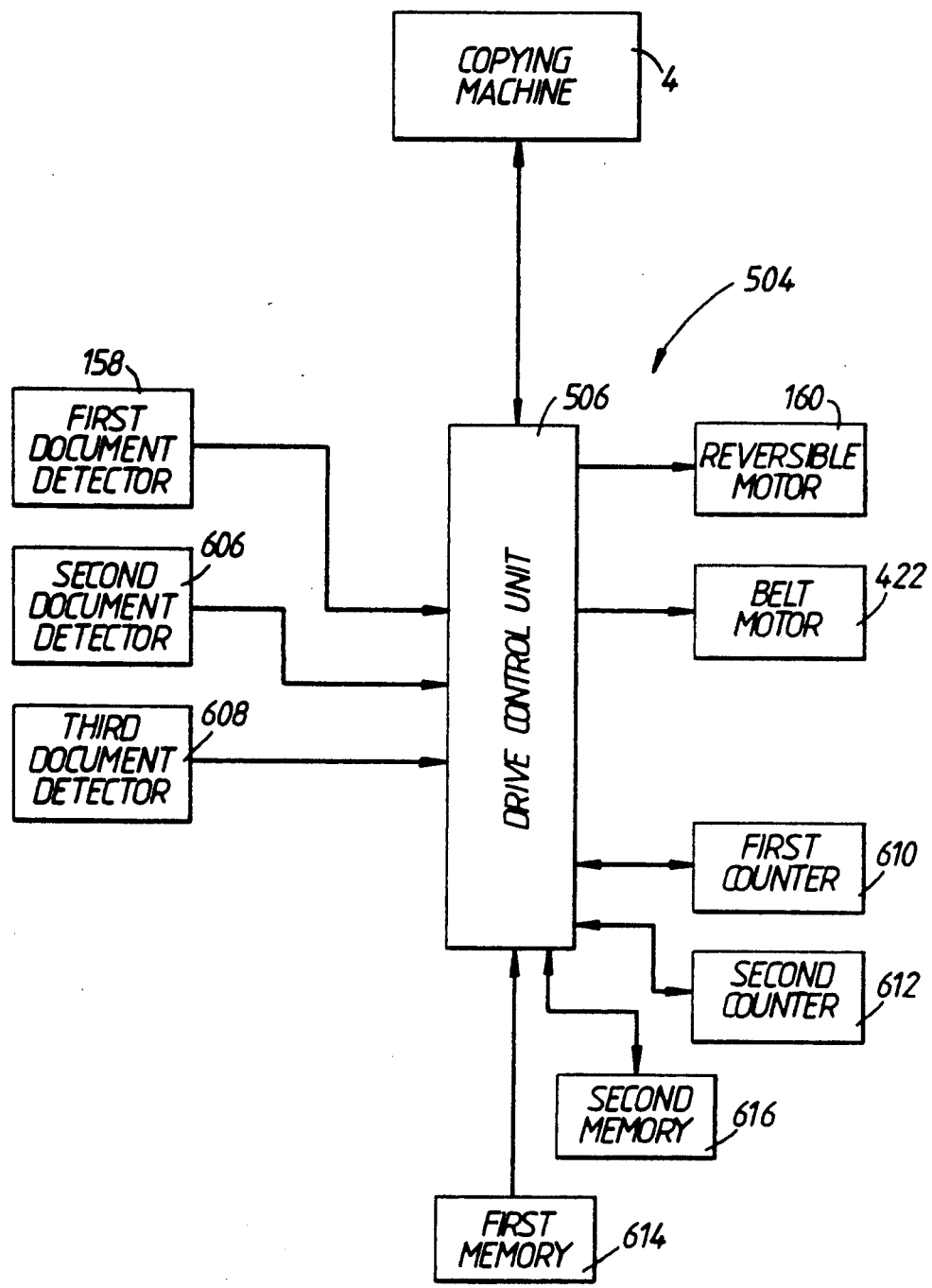
FIG. 4 is a block diagram showing a driving control system of the automatic original document feeding device according to the embodiment of FIG. 1.

The driving control system 504 of the document feeding unit 8 and the conveyor belt unit 6 will be described with reference to FIG. 4. The driving control system 504 has a driving control unit 506 connected to the copying machine 4, a first document detector 158, and a second document detector 606, which is arranged adjacent to the conveying rollers 124, 126 and serves to detect the leading and the trailing edge of the document fed by the feeding roller 122. A third document detector 608 is arranged adjacent to the discharging roller 14 and serves to detect whether or not the document is fed to the tray 18 by the discharging roller 14. A first counter 610 detects the size of the document by counting the rotations of the motor 160 while the document passes through the second detector 606, a second counter 612 counts the rotation time of the motor 422, a first memory 614 stores data related to the timing necessary for feeding the document from the position A to the exposing position C in accordance with various sizes of documents, and a second memory 616 stores data related to the size detected by the first counter 610. The belt motor 422 and the reversible motor 160 provide the necessary drawing power for the control system 504.

The driving control unit 506 controls the document feeding unit 8 and the conveyor belt unit 6 such that the next document is not fed to the waiting position A until the copying operation of the previous document ends and the next document is fed from the waiting position A to the exposing position C with an interval distance between the trailing edge of the previous document and the leading edge of the next document longer than the distance between the discharging roller 14 and the belt roller 386.

The operation of the automatic document feeder will be described with reference to FIGS. 4 and 5.

When the start button 38 on the operation panel 30 of the copying machine 4 is operated, the detector 158 detects the presence or absence of documents.

In case of the absence of documents, the feeding unit 8 and the belt conveyor unit 6 do not operate. In case of the presence of documents, the driving control unit 506 receives signals from the detectors 158, 606, 608, the counters 610, 612 and the memories 614, 616 and controls the operation of the motors 422, 160.

Figure 5:
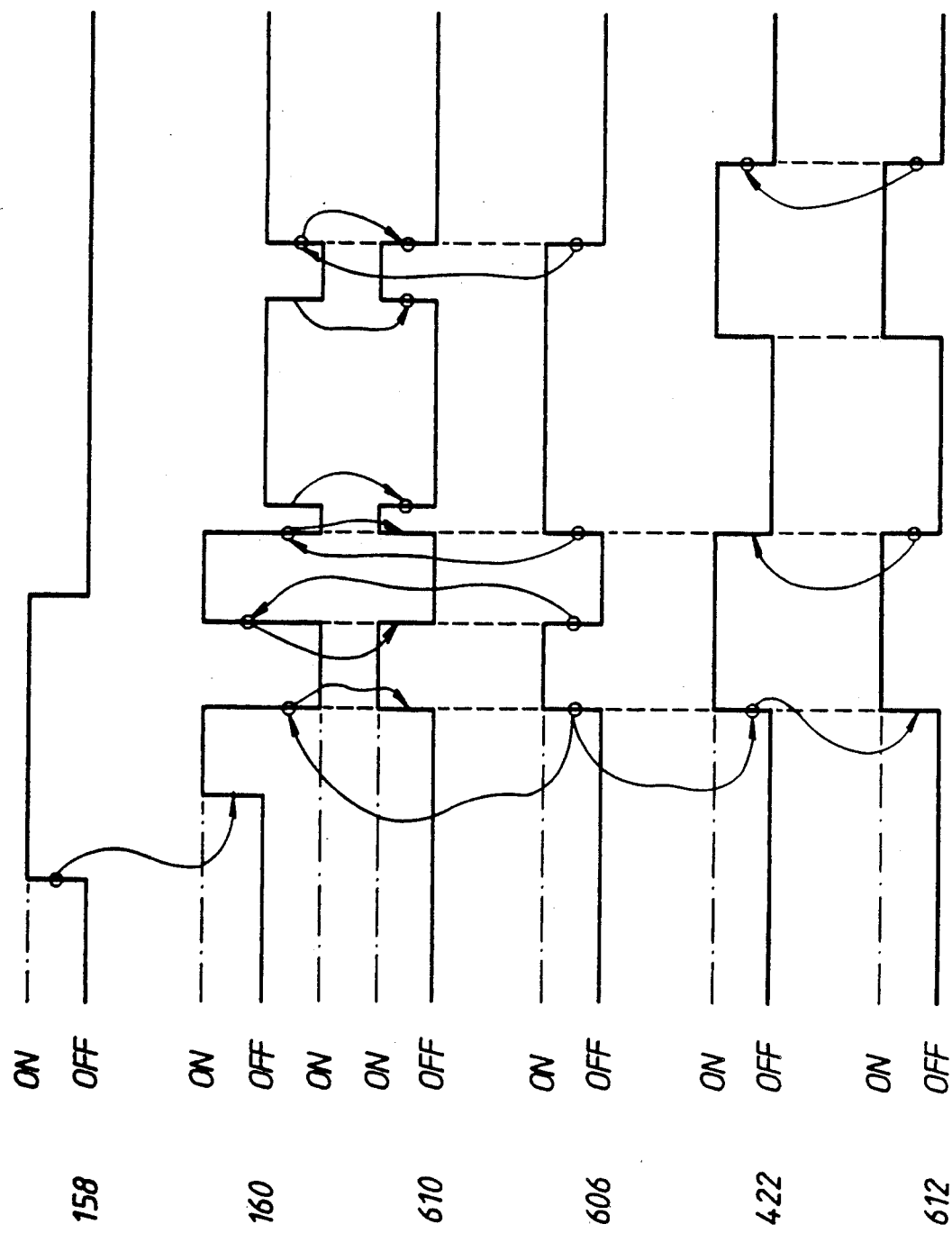
FIG. 5 is a timing chart showing the operation of the control system according to the present invention.

As shown in FIG. 5, when the first document detector 158 turns on, the feeding motor 160 rotates in a predetermined direction, thereby rotating the feeding roller 122 and the separating rollers 118, 120. At this time the conveying rollers 124, 126 do not rotate.

A first document is fed by the feeding roller 122 and the separating rollers 118, 120. When the first document reaches a position adjacent to the conveying rollers 124, 126, the second document detector 606 detects the leading edge of the first document.

When the document detector 606 turns on, the feeding motor 160 begins to rotate in a reverse direction and also the first counter 610 begins to count the number of rotations of the feeding motor 160. Simultaneously the belt motor 422 begins to rotation and the second counter 612 begins to count the rotate time of the belt motor 422. Accordingly, the conveying rollers 124, 126, belt rollers 384, 386 and discharging roller 14 rotate. At the same time the feeding roller 122 and separating rollers 118, 120 are stopped. Accordingly, the first document is further fed and the trailing edge of the second document passes through the second document detector 606. When the first document detector 606 detects the trailing edge of the first document, the feeding motor 160 begins to rotate in the predetermined direction and the first counter 610 stops counting the rotations. The number of rotations counted by the first counter 610 is stored in the memory 616 as data corresponding to the size of the first document. At this time the feeding roller 122 and separating rollers 118, 120 begin to rotate and the conveying roller 124, 126 stops rotation. Thus, a second document begins to be fed.

When the second document reaches the position adjacent to the conveying roller 124, 126, the second document detector 606 detects the leading edge of the second document and the feeding motor 160 begins to rotate in the reverse direction. Also the first counter 610 begins to count the number of rotations of the feeding motor 160. When the number of rotations counted by the first counter 610 reaches a predetermined value necessary for the second document to arrive at the waiting position A, the first counter 610 stops counting. The feeding motor 160 stops rotating. Accordingly, the second document is preset at the waiting position.

On the other hand, when the time counted by the second counter 612 reaches a predetermined value necessary for the first document to arrive at the exposing position C, the second counter 612 stops counting and the belt motor 422 stops rotating. Accordingly, the first document is set at the exposing position C for copying by the copying machine 4.

After the copying operation with respect to the first document, the belt motor 422 is rotated again and the second counter 612 begins to count the rotation time of the belt motor 422. When the rotation time counted by the second counter 612 reaches a value equal to the time data read out from the first memory 614 corresponding to the size data stored in the second memory 616, the feeding motor 160 begins to rotate in the reverse direction. When the rotate time counted by the second counter 612 reaches a value which is the time necessary for the second document to arrive at the exposing position C, the belt motor 422 stops rotation.

Accordingly, the first document is fed from the exposing position C to the document tray 18 by the belt 12 and discharging roller 14, and the second document is fed from the waiting position A to exposing position C by the conveying roller 124, 126 and the belt 12.

After the second document is copied at the exposing position C, the second document is discharged in the same manner described above with respect to the first document.

If the presence of a third document is detected by the document detector 158, the third document is fed in the same manner as the second document.

If the absence of a third document is detected, the operation of the auto document feeder ends after the third document detector 608 detects the discharge of the second document.

Other embodiments of the invention will be apparent to these skilled in the art from consideration of the specification and practice of the invention disclosed herein. It is intended that the specification and examples be considered as exemplary only, with the true scope and spirit of the invention being indicated by the following claims.

What is claimed is:

1. An image forming apparatus for successively forming images, each corresponding to one of a plurality of original documents, the apparatus comprising:

a start position for initially supporting the plurality of original documents, a predetermined position where each original document is scanned, and a prescribed path between the start position and the predetermined position;

first feeding means for sequentially feeding the plurality of original documents from the start position to a waiting position along the prescribed path between the start position and the predetermined position;

means for detecting the size of the original document fed by said first feeding means;

second feeding means for feeding the original document fed by said first feeding means from the waiting position to the predetermined position along the prescribed path, with an interval corresponding to the size detected by said detected means; and means for forming an image corresponding to each scanned original document.

2. The apparatus of claim 1, wherein the first feeding means comprises a plurality of feeding rollers and a motor for rotating the plurality of feeding rollers.

3. The apparatus of claim 2, wherein the detecting means includes a counter for detecting the size of the original document by counting the rotations of the motor.

4. An image forming apparatus for successively forming images, each corresponding to one of a plurality of original documents, the apparatus comprising:

a start position for initially supporting the plurality of original documents, a predetermined position where each original document is scanned, and a prescribed path between the start position and the predetermined position, comprising:

first feeding means for sequentially feeding the plurality of original documents from the start position to a waiting position along the prescribed path between the start position and the predetermined position;

means for detecting the size of the first original document fed by said first feeding means;

first memory means for storing the size detected by said detecting means;

second memory means for storing data related to the timing necessary for feeding the original document from the waiting position to the predetermined position in accordance with various sizes of original documents;

means for reading out data corresponding to the document size stored by said first memory means from said second memory means;

second feeding means for beginning to feed the original document fed by said first feeding means from the waiting position to the predetermined position along the prescribed path at a timing based on data read out by said reading out means;

means for scanning each original document fed by said second feeding means in the predetermined position; and means for forming an image corresponding to each scanned original document.

5. The apparatus of claim 4, wherein the first feeding means comprises a plurality of feeding rollers and a motor for rotating the plurality of feeding rollers.

6. The apparatus of claim 5, wherein the detecting means has a detector for detecting the leading and trailing edge of the first original document and a counter for detecting the size of first original document by counting the rotations of the motor while the first original document passes through the detector.

* * * * *